United States Patent
Lee et al.

(10) Patent No.: US 10,459,550 B2
(45) Date of Patent: Oct. 29, 2019

(54) DETECTION AND UPDATING METHOD OF TOUCH SYSTEM

(71) Applicants: IMAGINATION BROADWAY LTD., New Taipei (TW); SALT International Corp., New Taipei (TW)

(72) Inventors: Shang-Li Lee, New Taipei (TW); Ko-Hao Ting, New Taipei (TW); Meng-Chien Liu, New Taipei (TW)

(73) Assignees: IMAGINATION BROADWAY LTD., New Taipei (TW); SALT INTERNATIONAL CORP., New Taipei (TW)

(*) Notice: Subject to any disclaimer, the term of this patent is extended or adjusted under 35 U.S.C. 154(b) by 16 days.

(21) Appl. No.: 15/873,377

(22) Filed: Jan. 17, 2018

(65) Prior Publication Data

US 2018/0203535 A1    Jul. 19, 2018

(30) Foreign Application Priority Data

Jan. 18, 2017 (TW) .............................. 106101670 A

(51) Int. Cl.
G06F 3/041 (2006.01)
G06F 3/044 (2006.01)

(52) U.S. Cl.
CPC .............. *G06F 3/041* (2013.01); *G06F 3/044* (2013.01); *G06F 3/0418* (2013.01); *G09G 2300/0426* (2013.01)

(58) Field of Classification Search
CPC .. G06F 3/041–047; G06F 2203/04101–04113; G09G 2300/0426
USPC ........................................................ 345/178
See application file for complete search history.

(56) References Cited

U.S. PATENT DOCUMENTS

| | | | |
|---|---|---|---|
| 2012/0056851 A1* | 3/2012 | Chen ....................... | G06F 3/044 345/174 |
| 2015/0220210 A1* | 8/2015 | Sturdevant .............. | G06F 3/044 345/178 |
| 2015/0324035 A1* | 11/2015 | Yuan ..................... | G06F 3/0416 345/174 |
| 2016/0299635 A1* | 10/2016 | Glover .................... | G06F 3/017 |
| 2016/0370894 A1* | 12/2016 | Povalac ................ | G06F 3/0416 |

* cited by examiner

*Primary Examiner* — Stephen G Sherman
(74) *Attorney, Agent, or Firm* — WPAT, PC

(57) ABSTRACT

A detection and updating method of touch system includes: proceeding an ideal base signal measurement to obtain a plurality of ideal base signals under an ideal state; proceeding a raw base signal measurement to obtain a plurality of raw base signals under a raw state; forming a linear relationship related by the ideal base signals and the raw base signals to obtain two coefficients; calculating a plurality of new base signals according to the two coefficients and the ideal base signals; and, proceeding a base signal updating method by the new base signals.

11 Claims, 6 Drawing Sheets

DETECTION AND UPDATING METHOD OF TOUCH SYSTEM

CROSS-REFERENCE TO RELATED APPLICATION

This application claims the benefit of priority to Taiwan patent application Ser. No. 106101670 entitled "DETECTION AND UPDATING METHOD OF TOUCH SYSTEM", filed Jan. 18, 2017, which is also incorporated herein by reference.

FIELD OF THE INVENTION

The present invention pertains to a touch system and a detection and updating method, and especially pertains to a touch system and a touch detection method applied in touch panel, where there are polar molecules such as water, palm or other noise on its surface. The present invention can immediately and efficiently updating the base signal to obtain the precise touch signal.

BACKGROUND OF THE INVENTION

A touch panel or touch screen is one of the major interfaces between human and machine, and as a recognition device, can ingeniously combine input and display interfaces, and therefore has the advantages of saving device space and user-friendly operation. Nowadays it has been generally applied to a wide variety of consuming or industrial electronic products. For example, PDAs (Personal Digital Assistant), palm-sized PCs (Personal Computers), tablet computers, mobile phones, handwriting input devices for a smart phone, IAs (Information Appliances), ATMs (Automated Teller Machines) and POS (Points-of-Sale), etc., which can generally be seen in various occasions of business and industry applications.

With the touch panel widely applied in a variety of electronic products, users have more need for the medium and large panel. For avoiding that wrist or palm inadvertently touches the panel, how to effectively determine the signal caused by wrist or palm and to prevent wrist or palm from interfering the detection result is the most important issue in touch technology, so user's wrist or palm can be easily placed on the panel. Moreover, water or steam could stains the touch panel in the humid environment, or the effect of temperature changes on the touch panel.

For solving said issue, updating the base signal is performed when the touch panel is non-active, and updating is not performed when the touch panel is active in the conventional method. However, the conventional method may cause a heterogeneous signal for a long time, which may be judged to be an abnormal operation, if there is palm or water stains staying on the touch panel when the touch system boots. For avoiding the abnormal operation, which is misjudged to be an object touch so an active signal is generated and updating the base signal is not performed, it needs a new method to solve the different base signal when detecting. Once the heterogeneous such as palm or water stains leaves the touch panel, it may cause the object touch misjudged if user touch the touch panel by an object such as finger or stylus.

SUMMARY OF THE PRESENT INVENTION

The present invention is updated the integrated base signal computed by two different signal measurements. According to the detection and updating method of touch system of the present invention, the negative state of the heterogeneous, such as palm or water stains, gradually decreases its influence on signal value with each update, and finally makes the negative state disappear during the detection period. The present invention can eliminate the abnormal operation or reduce the impact of abnormal boot, and avoid the error base signal caused by detecting the negative state for a long time.

At least some of these and other objectives described herein will be met by some embodiments of the present invention.

In order to achieve one, some or all of the above stated objectives or others, a detection and updating method of touch system is disclosed. The touch system includes a plurality of driving electrodes and a plurality of sensing electrodes. The detection and updating method includes the steps of: proceeding an ideal base signal measurement to obtain a plurality of ideal base signals under an ideal state, wherein the ideal base signal measurement includes the steps of driving the driving electrodes in turns or in groups with a plurality of measuring frequencies, and detecting electrical changes on the sensing electrodes in turn; proceeding a raw base signal measurement to obtain a plurality of raw base signals under a raw state, wherein the raw base signal measurement comprises the steps of driving at least one of the driving electrodes, then detecting electrical changes on a part of the sensing electrodes to obtain a part of the raw base signals, and repeating the same to obtain all of the raw base signals; forming a regression related by the ideal base signals and the raw base signals to obtain at least one coefficient; calculating a plurality of new base signals according to the coefficient and the ideal base signals; and, proceeding a base signal updating method by the new base signals.

In an embodiment, the step of proceeding the ideal base signal measurement is segmental, after obtaining the part of the raw base signals, said step comprises driving another one of the driving electrodes and then detecting electrical changes on another part of the sensing electrodes to obtain another part of the raw base signals, and an object measurement is proceeded at alternate proceeding the ideal base signal measurements. In another embodiment, an object measurement with the measuring frequencies is proceeded to obtain an object signal; at the same time, the ideal base signal measurement is proceeded.

In an embodiment, the regression is a linear regression, and the number of the coefficient is two. The method further includes the step of calculating the object signal and the new base signals to obtain a touch signal. In another embodiment, the regression is a non-linear regression, and the non-linear regression includes hyperbolic function, parabolic function, exponential function or logarithmic function.

In an embodiment, the touch system further comprises a grounding trace. The grounding trace is disposed next to the connection of one of the driving electrodes or one of the sensing electrodes, or disposed between the connections of the driving electrodes and the sensing electrodes.

In an embodiment, the detection and updating method further includes the step of proceeding a base signal compensating method. The base signal compensating method includes the steps of: proceeding a noise detection with the measuring frequencies; proceeding the two ideal base signal measurement with two adjacent measuring frequencies to orderly obtain two ideal base signals if there is no noise; recording an ideal difference between the two ideal base signals; calculating two new base signals according to the coefficient and the two ideal base signals; recording an new difference between the two new base signals; and, compensating another new base signals obtained by different measuring frequency according to the new difference.

In an embodiment, the base signal compensating method is not proceeded and an object measurement is not performed with the measuring frequency if there is noise under that measuring frequency. Meanwhile, a hopping number of not proceeding the base signal compensating method and the object measurement with said measuring frequency is counted if there is noise. The object measurement is re-proceeded with any of the measuring frequencies and the base signal updating method is proceeded if the hopping number is greater than a threshold.

In an embodiment, the measuring frequencies includes a first measuring frequency, a second measuring frequency and a third measuring frequency. The base signal compensating method further includes the steps of: proceeding the first ideal base signal measurement with the first measuring frequency to obtain a first ideal base signal and then proceeding the two ideal base signal measurement with the second measuring frequency then the third measuring frequency to orderly obtain a second ideal base signal and a third ideal base signal if there is no noise; recording an first ideal difference between the first and second ideal base signals and an second ideal difference between the second and third ideal base signals; respectively calculating a first new base signal, a second new base signal and a third new base signal according to the coefficient and the first ideal base signal, the second ideal base signal and the third ideal base signal; and, recording a first difference between the first and second new base signals, and a second difference between the second and third new base signals.

DETAILED DESCRIPTION OF THE INVENTION

It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. Thus, for example, reference to "a material" may include mixtures of materials; reference to "a display" may include multiple displays, and the like. References cited herein are hereby incorporated by reference in their entirety, except to the extent that they conflict with teachings explicitly set forth in this specification.

Figure 1:
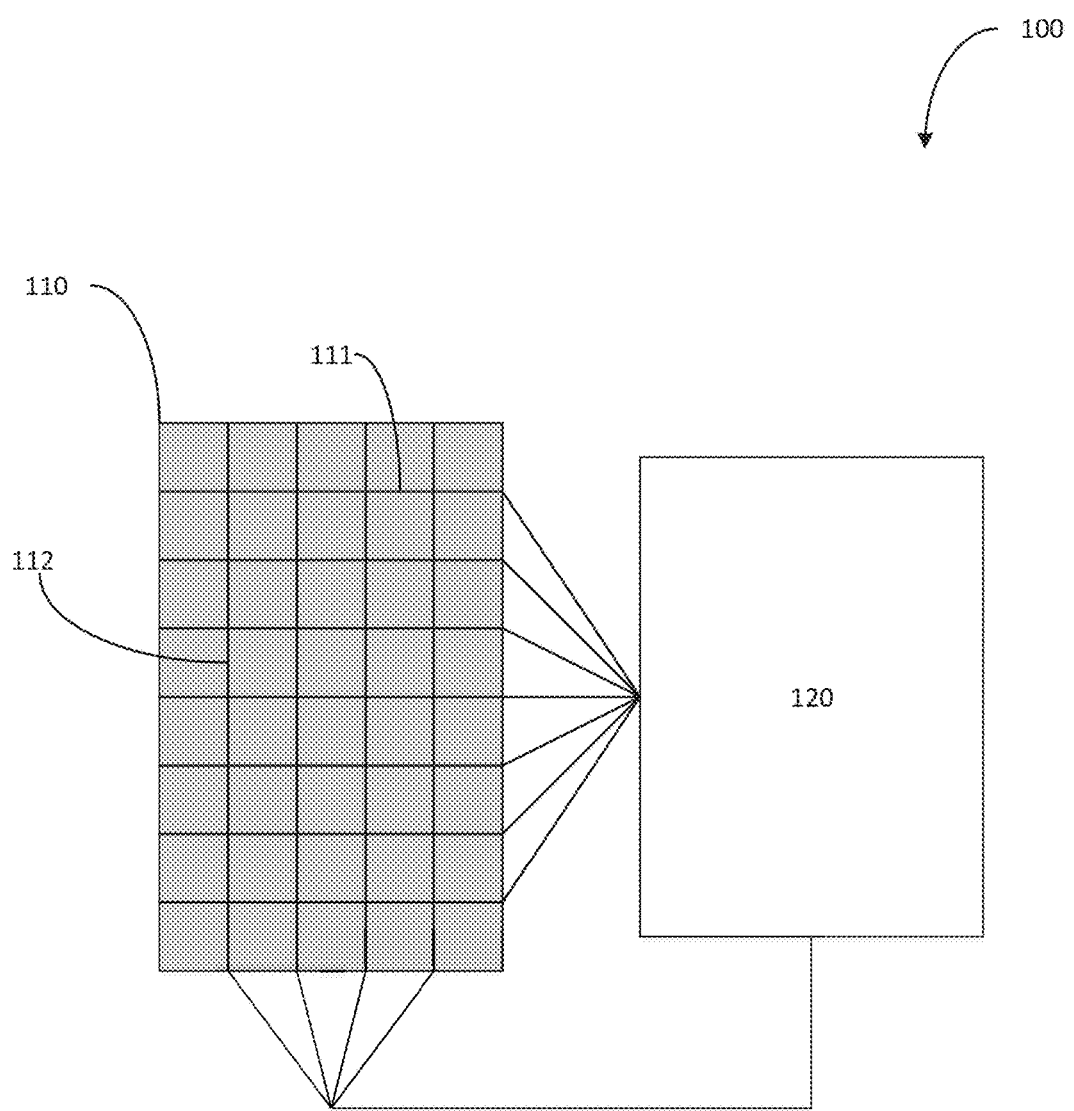
FIG. 1 is a schematic diagram of a touch system of an embodiment.

Please refer to FIG. 1, is a schematic diagram of a touch system 100 of an embodiment according to the present invention. The touch system 100 at least includes a touch module 110 and a controller module 120 electrically connected to the touch module 110. A person of ordinary skill in the art may understand that the touch system 100 may include other modules or elements not related to the present invention and is not shown in the figure. In the present embodiment, the touch module 110 may be a part of a touch screen or a part of a touch panel. There are a plurality of first electrodes 111 and a plurality of second electrodes 112 disposed on a board of the touch module 110. There are a plurality of overlapped regions between the first electrodes 111 and the second electrodes 112. The controller module 120 is electrically connected to the first electrodes 111 and the second electrodes 112, and the connection may not be shown in FIG. 1 and is not limited in the present invention. If the touch module is a projective capacitive touch device, the first electrode 111 is a driving electrode for receiving the driving voltage and the second electrode 112 is a sensing electrode for detecting the electrical changes. The driving electrodes 111 and the sensing electrodes are controlled and detected by the control module 120.

When the touch regions is scanned, the control module 120 drives the driving electrodes 111 in turns and detects electrical changes of the sensing electrodes 112. When the touch system is booted or inactive, the touch regions is kept to be scanned to obtain the base signal of each signal point. If there is any electrical changes of the sensing electrodes 112, the control module 120 determines there is a touch object around the overlapped regions of the driving electrodes 111 and the sensing electrodes 112 and an object signal is obtained. A touch signal is generated by performing subsequent operations with the above-obtained base signal and the object signal.

Figure 2:
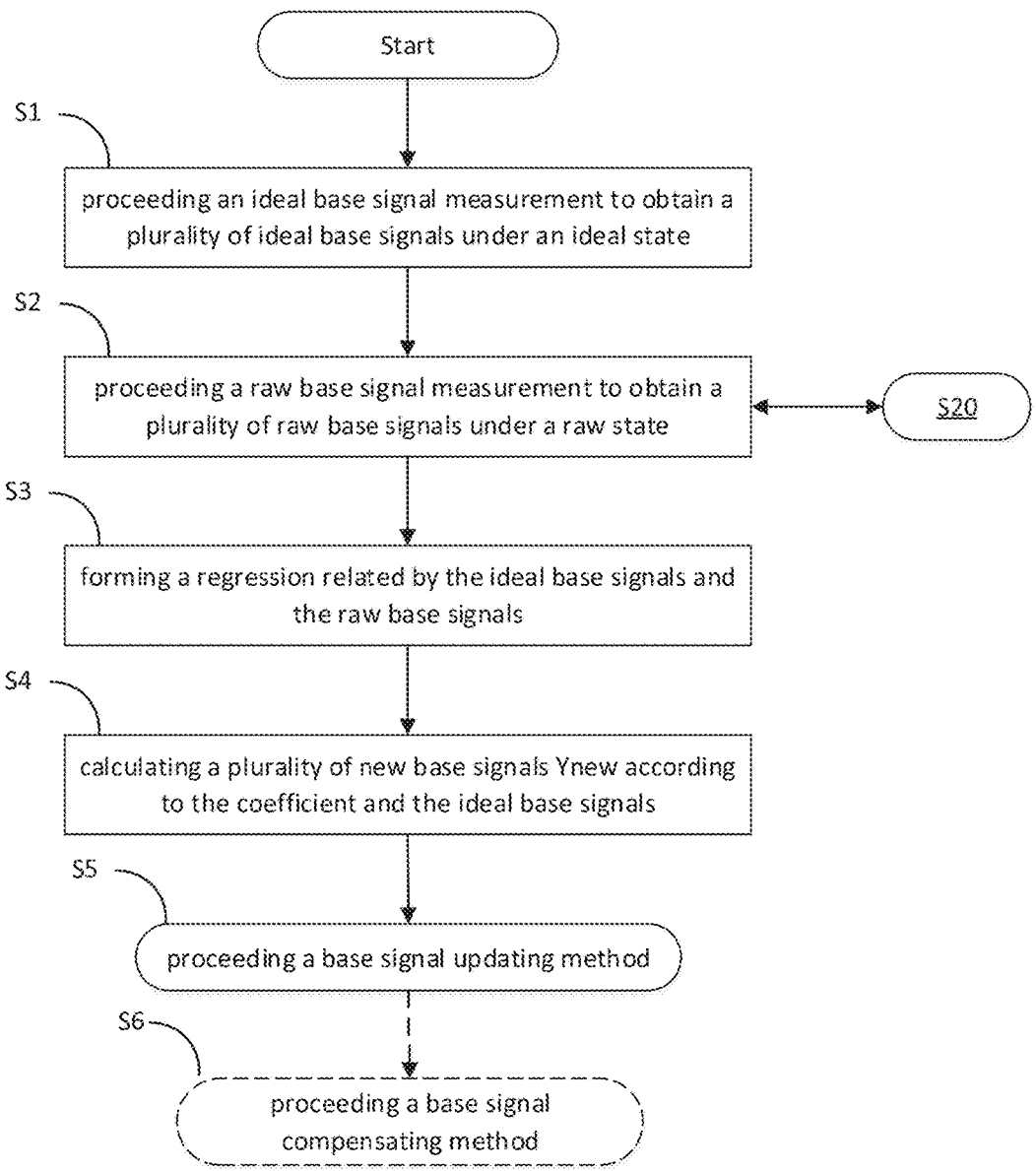
FIG. 2 is a flow chart of a detection and updating method of an embodiment according to the present invention.

The following descripts that the present invention is updated with the integrated base signal, which is computed by two different signal measurements. The present invention can eliminate the abnormal operation or reduce the impact of abnormal boot, and avoid the error base signal caused by detecting the negative state for a long time. Refer to FIG. 2, which is a flow chart of a detection and updating method of an embodiment according to the present invention. The detection and updating method includes the steps of:

Step S1: proceeding an ideal base signal measurement to obtain a plurality of ideal base signals under an ideal state. The ideal state means the known or controlled environmental conditions including noise, temperature, humidity, etc. The ideal base signal measurement includes the steps of driving the driving electrodes in turns or in groups (for example, each three driving electrodes is for a group and all the driving electrodes are divided into three groups) with a plurality of measuring frequencies, and detecting electrical changes on the sensing electrodes in turn.

Figure 3:
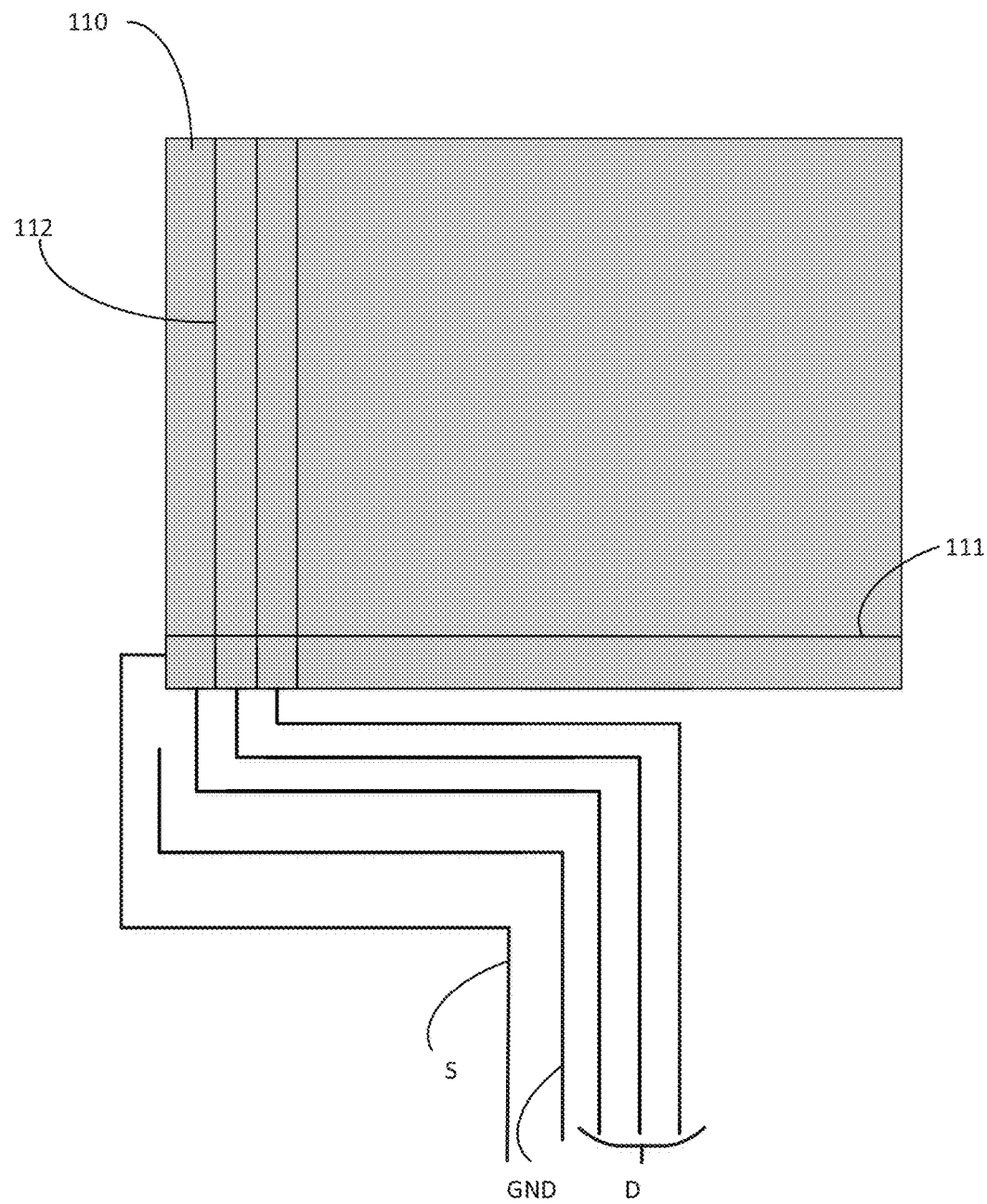
FIG. 3 is a schematic diagram of the connections of the driving electrodes and the sensing electrodes, and a grounding trace of a touch system of another embodiment.

For obtaining the ideal base signal without noise, a grounding trace is disposed to create the ideal environmental conditions to avoid the signal interference from the edge-driven electrode in the touch system of the present invention. It impacts the detection and subsequent calculation of the ideal base signals. A schematic diagram of the connections D of the driving electrodes 111 and the connections S of the sensing electrodes 112, and the grounding trace GND of a touch system of another embodiment is shown in FIG. 3. The silver grounding trace GND is disposed next to the outer edge of the connection D of one of the driving electrodes or the outer edge of the connection S of one of the sensing electrodes, or disposed between the connections of the driving electrodes D and the sensing electrodes S.

Step S2: proceeding a raw base signal measurement to obtain a plurality of raw base signals under a raw state. The raw state means the unknown or uncontrolled environmental conditions including the changing temperature, the changing humidity, etc. The raw base signal measurement includes the steps of driving at least one of the driving electrodes, then detecting electrical changes on a part of the sensing electrodes to obtain a part of the raw base signals, and repeating the same to obtain all of the raw base signals. At the same time, an object measurement with the measuring frequencies is proceeded to obtain an object signal.

Figure 4:
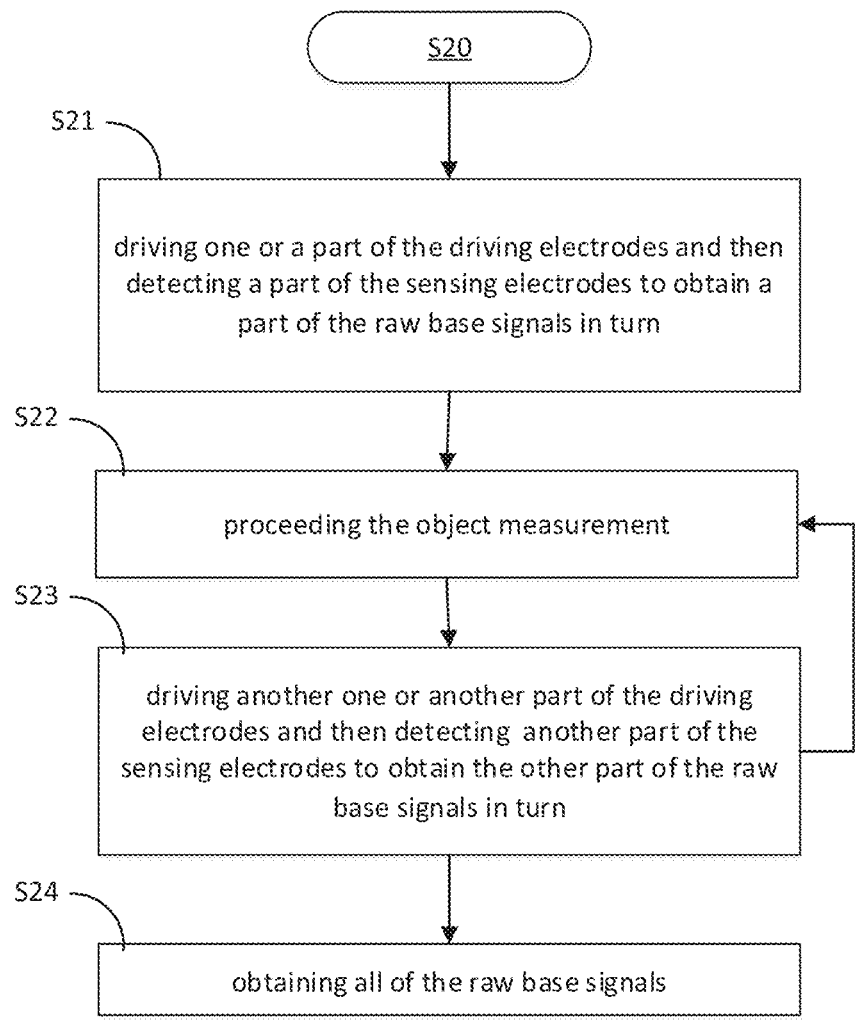
FIG. 4 and FIG. 5 are the flow charts based on FIG. 1.

In an embodiment, the step of proceeding the raw base signal measurement is segmental. After obtaining the part of the raw base signals, the raw base signal measurement includes the steps of driving another one of the driving electrodes and then detecting electrical changes on another part of the sensing electrodes to obtain another part of the raw base signals. The object measurement is proceeded between at two alternate proceeding the raw base signal measurements. A detailed flow chart of step S2 is shown as the following steps S20 to S24 in FIG. 4.

Step S20: the acquiring manner of the raw base signals is that driving each one or each group of the driving electrodes (for example, each three driving electrodes is for a group and all the driving electrodes are divided into three groups), but not driving all of the driving electrodes in one time. It avoids the long scanning time and saves the overall signal measurement time.

Step S21: driving one or a part of the driving electrodes and then detecting electrical changes on a part of the sensing electrodes to obtain a part of the raw base signals in turn.

Step S22: alternately proceeding the object measurement with different measuring frequencies to obtain the object signal.

Step S23: driving another one or another part of the driving electrodes and then detecting electrical changes on another part of the sensing electrodes to obtain the other part of the raw base signals in turn. If not acquiring all of the raw base signals yet, it goes back to the step S22 of proceeding the object measurement and then the step S23 is proceeded until all of the raw base signals are obtained.

Step S24: transmitting the raw base signals to the step S3 after obtaining all of the raw base signals.

Step S3: forming a regression related by the ideal base signals and the raw base signals: Y (raw base)=a X (ideal base)+b;

Wherein the regression is a linear regression, but is not limited in the present invention. X represents the ideal base signals and Y represents the raw base signals. Two coefficients a and b are obtained by the linear regression.

Step S4: calculating a plurality of new base signals Ynew according to the coefficient and the ideal base signals.

In an embodiment, the regression is an non-linear regression. The non-linear regression is formed by the ideal base signals X and the raw base signals Y. For example, the hyperbolic function is $Y=a+b(1/X)$; the parabolic function is $Y=a+bX+cX^2$; the exponential function is $Y=ab^X$; and, the logarithmic function is $Y=a+b\cdot\ln(X)$. The non-linear regression analysis is alternated to the linear regression for obtaining the coefficients a, b and c. Under different conditions (measurement environment), the coefficients a, b and c will change with linear regression or non-linear regression to avoid the more extreme raw base signals. It will impact the subsequent calculation of the object signals.

Step S5: proceeding a base signal updating method by the new base signals from the step S4.

Figure 5:
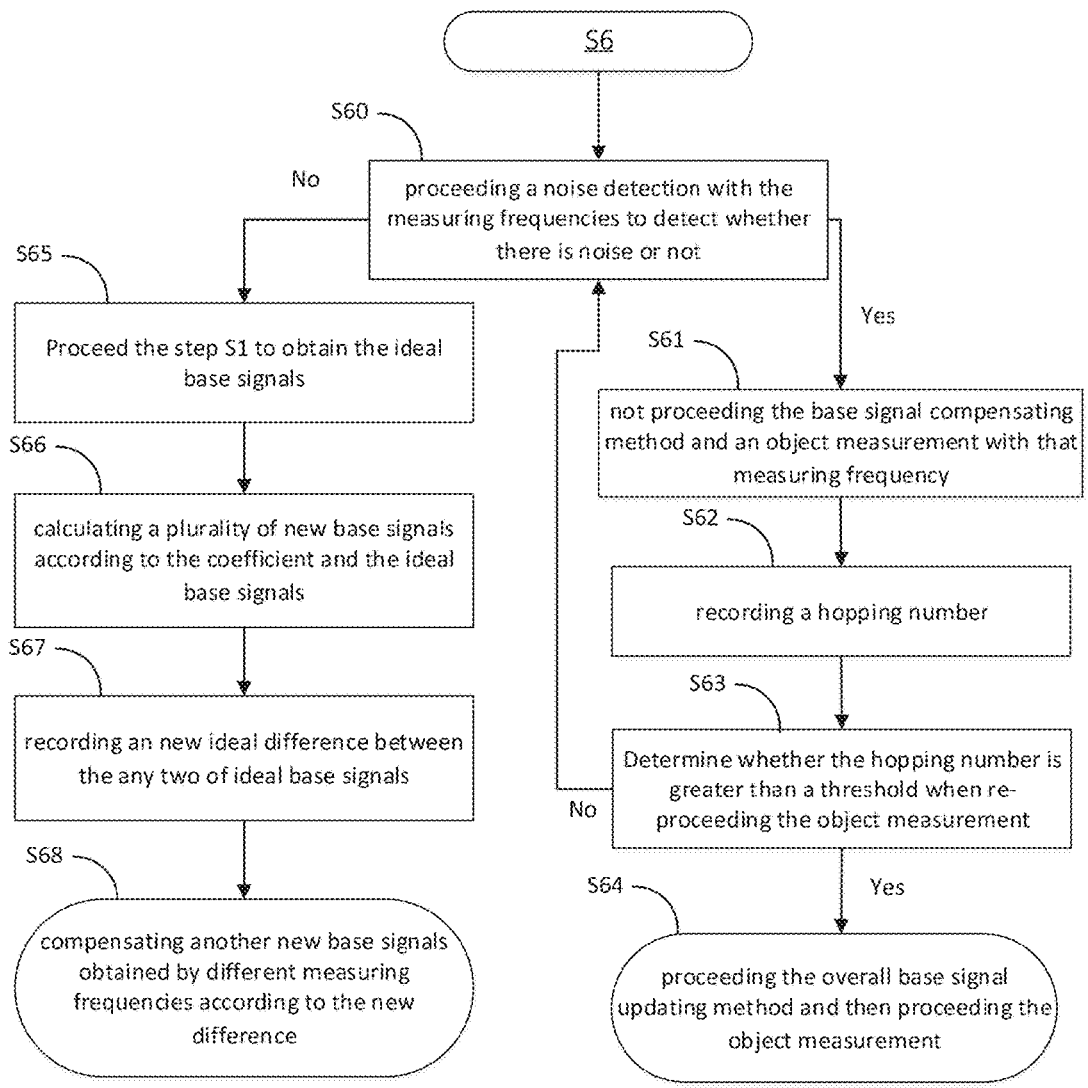

In an embodiment, the detection and updating method further includes the step S6 of proceeding a base signal compensating method. Another base signals obtained by different measuring frequency (under any measuring mode) is compensated by the base signal compensating method according to the difference between the two base signals, which are obtained by two measuring frequencies. FIG. 5 is the flow charts of the base signal compensating method.

Step S60: proceeding a noise detection with a plurality of different measuring frequencies to detect whether there is noise or not.

Step S61: not proceeding the base signal compensating method and an object measurement with the measuring frequency if there is noise under that measuring frequency.

Step S62: counting a hopping number of not proceeding the base signal compensating method and an object measurement with said measuring frequency if there is noise.

Step S63: re-proceeding the object measurement with any of the measuring frequencies, and going to the next step S64 if the hopping number is greater than a threshold; or, going back to the step S60 and proceeding the object measurement with another measuring frequency if the hopping number is less than the threshold.

Step S64: proceeding the overall base signal updating method and then proceeding the object measurement with any one of the measuring frequencies if the hopping number is greater than the threshold. Finally, the object signal and the new base signals obtained by the overall base signal updating method are calculated to obtain a touch signal.

Step S65: based on the step S1, proceeding the two ideal base signal measurement with two adjacent measuring frequencies to orderly obtain two ideal base signals if there is no noise after the step S60. Moreover, an ideal difference between the two ideal base signals under two adjacent measuring frequencies is computed and recorded.

Step S66: based on the step S4, computing a plurality of new base signals according to the coefficient from the step S3 and the ideal base signals from the step S65.

Step S67: recording an new difference between the any two of ideal base signals with two adjacent measuring frequencies from the step S66.

Step S68: replacing the ideal difference as the new difference and then compensating another new base signals obtained by different measuring frequencies according to the new difference.

Figure 6:
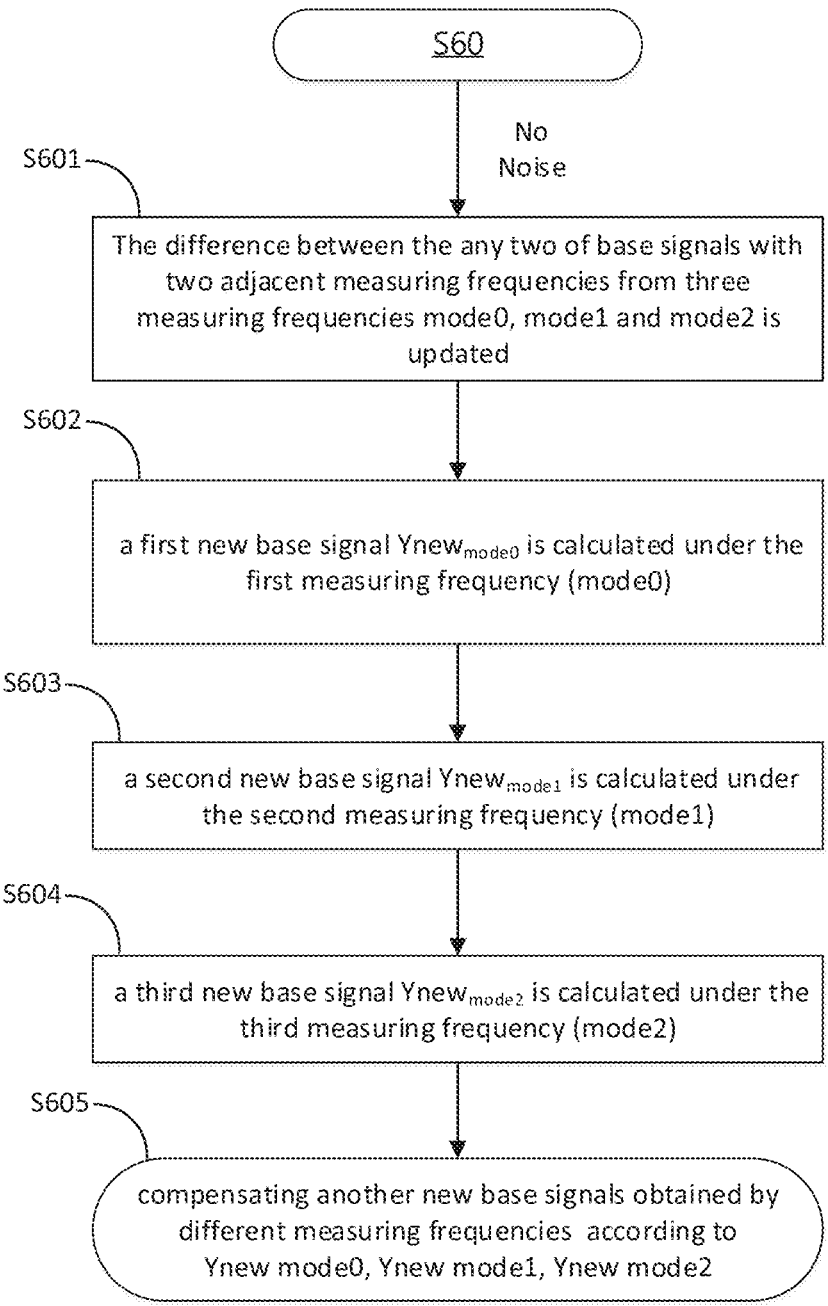
FIG. 6 is a flow chart based on FIG. 1.

In an embodiment, the measuring frequencies includes a first measuring frequency (mode0), a second measuring frequency (mode1) and a third measuring frequency (mode2). FIG. 6 is the flow charts of the base signal compensating method.

The step S601 is performed after the step S60 in FIG. 5. The difference between the any two of base signals with two adjacent measuring frequencies from said three measuring frequencies mode0, mode1 and mode2 is updated by the step S601.

In the steps S602 to S604, the first, second and third ideal base signal measurements are orderly proceeded with the first, second and third measuring frequencies if there is no noise. The ideal base signal measurements includes the steps of driving the driving electrodes in turns or in groups and detecting electrical changes on the sensing electrodes in turn. A first ideal base signal ($base_{mode0}$) is obtained by the first ideal base signal measurement; a second ideal base signal ($base_{mode1}$) is obtained by the second ideal base signal measurement; and then, a third ideal base signal ($base_{mode2}$) is obtained by the third ideal base signal measurement. Moreover, a first ideal difference between the first and second ideal base signals, which is mode $diff1_{base}=base_{mode1}-base_{mode0}$, is recorded, and a second ideal difference between the second and third ideal base signals is recorded, which is mode $diff2_{base}=base_{mode2}-base_{mode1}$.

Next, based on the steps S1 to S4, a first new base signal $Ynew_{mode0}$ is calculated according to the coefficients and the first ideal base signal; a second new base signal $Ynew_{mode1}$ is calculated according to the coefficients and the second ideal base signal; and, a third new base signal $Ynew_{mode2}$ is calculated according to the coefficient and the third ideal base signal. Then, a first difference between the first and second new base signals, which is mode $diff1=Ynew_{mode1}-Ynew_{mode0}$, is recorded, and a second difference between the second and third new base signals, which is mode $diff2=Ynew_{mode2}-Ynew_{mode1}$, is recorded.

Then, go to the step S605 (as the step S68 in FIG. 5), and the first and second ideal differences mode $diff1_{base}$ and mode $diff2_{base}$ are respectively replaced as the first and second differences mode diff1 and mode diff2, according to the first, second and third new base signals $Ynew_{mode0}$, $Ynew_{mode1}$ and $Ynew_{mode2}$. Finally, another new base signals obtained by three different measuring frequencies are compensated according to the new difference mode diff1 or mode diff2.

According to the detection and updating method of touch system of the present invention, the negative state of the heterogeneous, such as palm or water stains, gradually decreases its influence on signal value with each update, and finally makes the negative state disappear during the detection period. The present invention can eliminate the abnormal operation or reduce the impact of abnormal boot, and avoid the error base signal caused by detecting the negative state for a long time.

What is claimed is:

1. A method of updating ideal base signals for a capacitive touch system, wherein the touch system comprises a plurality of driving electrodes, a plurality of sensing electrodes, and a grounding trace, the method comprising steps of:
  proceeding an ideal base signal measurement to obtain a plurality of first base signals as ideal base signals under an ideal state with the grounding trace blocking signal interferences, wherein the ideal base signal measurement comprises driving the driving electrodes in turns or in groups with a plurality of measuring frequencies, and then detecting the sensing electrodes in turn;
  proceeding a raw base signal measurement to obtain a plurality of raw base signals under a raw state, wherein the raw base signal measurement comprises driving at least one of the driving electrodes, then detecting a part of the sensing electrodes to obtain a part of the raw base signals, and repeating to obtain the plurality of raw base signals;
  forming a regression related by the plurality of first base signals and the raw base signals to obtain at least one coefficient;
  calculating a plurality of first new base signals according to the coefficient and the plurality of first base signals; and
  updating the ideal base signals with the first new base signals.

2. The method of claim 1, wherein the step of proceeding the raw base signal measurement is segmental, and further comprises driving another one of the driving electrodes and then detecting another part of the sensing electrodes to obtain another part of the raw base signals, and an object measurement is proceeded at alternate proceeding the ideal base signal measurements.

3. The method of claim 1, wherein the touch system conducts an object measurement with the measuring frequencies to obtain an object signal while the raw base signal measurement is proceeded.

4. The method of claim 3, wherein the touch system calculates the object signal and the first new base signals to obtain a touch signal.

5. The method of claim 4, wherein the regression is a linear regression, and the coefficient comprises a first coefficient and a second coefficient.

6. The method of claim 1, wherein the regression is a non-linear regression, and the nonlinear regression includes hyperbolic function, parabolic function, exponential function or logarithmic function.

7. The method of claim 1, further comprising:
  proceeding a noise detection with the measuring frequencies; and
  compensating ideal base signals if there is no noise, comprising:
    proceeding the ideal base signal measurement to obtain a plurality of second base signals under the ideal state with the ground trace blocking signal interferences;
    calculating and recording an ideal difference between two second new base signals with two adjacent measuring frequencies;
  compensating the rest of the plurality of second new base signals in other different measuring frequencies according to the ideal difference.

8. The method of claim 7, further comprising:
  incrementing a hopping number if there is noise, and then proceeding the noise detection with the measuring frequencies.

9. The method of claim 8, further comprising:
  repeating the ideal base signal measurement, the raw base signal measurement, and forming the regression if the hopping number is greater than a threshold.

10. The method of claim 1, wherein the measuring frequencies comprises a first measuring frequency, a second measuring frequency, and a third measuring frequency, and the method further comprises:
  proceeding a noise detection with the measuring frequencies;
  proceeding the ideal base signal measurement to obtain a plurality of second base signals under the ideal state with the ground trace blocking signal interferences if there is no noise;
  calculating a plurality of second new base signals as the ideal base signals according to the coefficient and the plurality of second base signals;
  calculating and recording a first ideal difference between a first new base signal measured at a first frequency and a second new base signal measured at a second frequency, and calculating and recording a second ideal difference between the second new base signal and a third new base signal measured at a third frequency;
  compensating rest of second new base signals in other different measuring frequencies according to the first ideal difference or the second ideal difference.

11. The method of claim 1, wherein the grounding trace is disposed next to the connection of one of the driving electrodes or one of the sensing electrodes, or disposed between the connections of the driving electrodes and the sensing electrodes.

* * * * *